United States Patent
Buchmueller et al.

(10) Patent No.: US 10,458,567 B2
(45) Date of Patent: Oct. 29, 2019

(54) PROCESS MEDIUM-CONTROLLED REGULATING VALVE

(71) Applicant: Grohe AG, Hemer (DE)

(72) Inventors: Janik Buchmueller, Schwerte (DE); Nicole Palmer, Zell a. H. (DE); Bernd Bischoff, Hagen (DE)

(73) Assignee: Grohe AG, Hemer (DE)

( * ) Notice: Subject to any disclaimer, the term of this patent is extended or adjusted under 35 U.S.C. 154(b) by 88 days.

(21) Appl. No.: 15/873,353

(22) Filed: Jan. 17, 2018

(65) Prior Publication Data

US 2018/0142804 A1 May 24, 2018

Related U.S. Application Data

(63) Continuation of application No. PCT/EP2016/001186, filed on Jul. 11, 2016.

(30) Foreign Application Priority Data

Jul. 17, 2015 (DE) .................. 10 2015 009 106

(51) Int. Cl.
| | |
|---|---|
| *F16K 31/385* | (2006.01) |
| *F16K 21/12* | (2006.01) |
| *F16K 31/122* | (2006.01) |
| *F16K 31/34* | (2006.01) |
| *F16K 31/383* | (2006.01) |

(Continued)

(52) U.S. Cl.
CPC .......... *F16K 31/3855* (2013.01); *F16K 21/12* (2013.01); *F16K 31/1221* (2013.01); *F16K 31/34* (2013.01); *F16K 31/383* (2013.01); *F16K 17/105* (2013.01); *F16K 31/426* (2013.01)

(58) Field of Classification Search
CPC ........ F16K 17/06; F16K 17/08; F16K 17/082; F16K 17/085; F16K 17/087; F16K 17/10; F16K 17/105; F16K 31/3855; F16K 31/1221; F16K 31/34; F16K 31/383; F16K 31/426; F16K 21/12; Y10T 137/4336; Y10T 137/4343; Y10T 137/4351

See application file for complete search history.

(56) References Cited

U.S. PATENT DOCUMENTS

| | | |
|---|---|---|
| 4,787,411 A | 11/1988 | Moldenhauer |
| 5,167,251 A | 12/1992 | Kirstein |

(Continued)

FOREIGN PATENT DOCUMENTS

DE     3642669 A1    6/1988

*Primary Examiner* — Ian G Paquette
(74) *Attorney, Agent, or Firm* — Muncy, Geissler, Olds & Lowe, P.C.

(57) ABSTRACT

A process medium-controlled regulating valve for a liquid throughflow regulator, having a main valve, a pilot valve for controlling a main valve piston, a pilot valve piston which closes the pressure relief line in a closed position, a cleaning wire element which is stationary in the axial direction is guided with hole tolerance through the pilot line, and the pilot line can be moved along the cleaning wire element, which is guided therein, during a stroke adjustment of the main valve piston. The cleaning wire element has an actuating contour which, at least during the stroke adjustment, can be brought into sliding contact with a counter-contour formed on the main valve piston, with the build-up of a transverse force which acts on the cleaning wire element.

13 Claims, 6 Drawing Sheets

(51) Int. Cl.
  *F16K 17/10*  (2006.01)
  *F16K 31/42*  (2006.01)

(56)  References Cited

U.S. PATENT DOCUMENTS

| | | | |
|---|---|---|---|
| 5,456,279 A | | 10/1995 | Parsons et al. |
| 5,915,665 A | * | 6/1999 | Paese ........................ E03C 1/04 |
| | | | 251/30.04 |
| 5,996,965 A | | 12/1999 | Eichholz et al. |
| 7,182,096 B1 | | 2/2007 | Lordahl et al. |
| 8,069,877 B2 | * | 12/2011 | Jacobs .................. F16K 31/408 |
| | | | 137/509 |

* cited by examiner

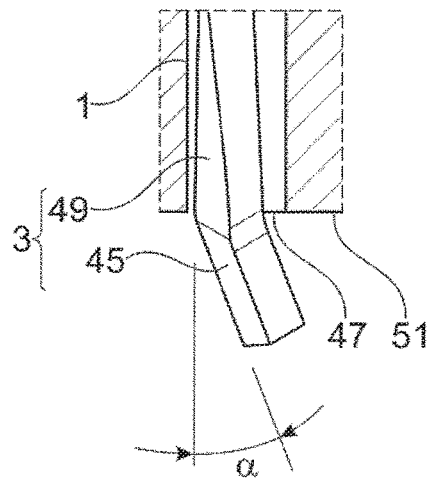
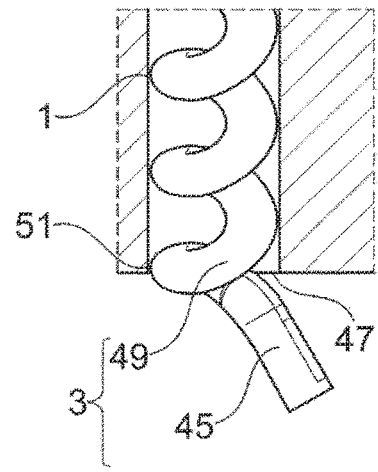
Fig. 6        Fig. 7
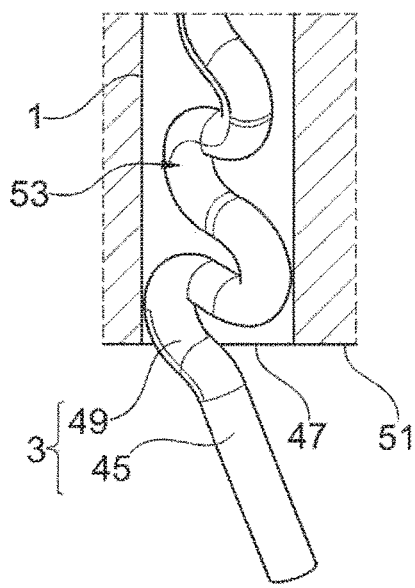
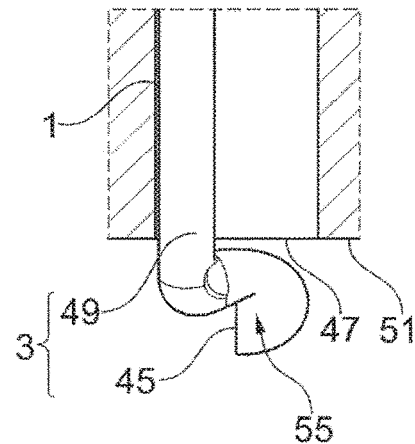
Fig. 8        Fig. 9

PROCESS MEDIUM-CONTROLLED REGULATING VALVE

This nonprovisional application is a continuation of International Application No. PCT/EP2016/001186, which was filed on Jul. 11, 2016, and which claims priority to German Patent Application No. DE 10 2015 009 106.9, which was filed in Germany on Jul. 17, 2015, and which are both herein incorporated by reference.

BACKGROUND OF THE INVENTION

Field of the Invention

The present invention relates to process medium-controlled regulating valve for a liquid throughflow regulator.

Description of the Background Art

A process medium-controlled regulating valve of this type can be used, for example, in a plumbing fixture by means of which the water outflow, for example, to a bathtub drain, a handheld shower head, or an overhead shower head, can be turned on or off. In the process medium-controlled regulating valve, the inlet-side water pressure is conducted via a pilot line to a pilot valve, which forms a control component for a main valve. The pilot valve uses a control chamber above a main valve piston to open or close the main valve.

A generic process medium-controlled regulating valve is known from DE 36 42 669 A1, which corresponds to U.S. Pat. No. 4,787,411. The regulating valve is made up of a main valve and a pilot valve. The main valve has a main valve piston with a stroke, adjustable in the axial direction, and a main valve seat which interacts therewith. An adjustable throughflow gap for regulating the liquid throughflow is defined between the main valve piston and the main valve seat. The main valve piston is controllable by the pilot valve. The pilot valve has a control chamber on the main valve piston side facing away from the main valve seat. This is fluidically connected via a pilot line in the main valve piston to the inlet chamber and via a pressure relief line to the outlet chamber. The pilot valve also has a pilot valve piston with a stroke that is adjustable manually or via a solenoid. In a closed position, the piston closes the pressure relief line, as a result of which a closing pressure builds up in the control chamber and the main valve piston is stroke adjustable in a closing direction. In an open position, the pilot valve piston opens the pressure relief line, as a result of which a pressure equalization is established between the control chamber and the outlet chamber and, due to the water pressure present in the inlet chamber, the main valve piston is stroke adjustable in an opening direction.

Over the course of the operating life, the pilot line can become clogged with impurities, for example, lime deposits. To eliminate such impurities, it is known from DE 36 42 669 A1 to guide a cleaning wire element, which is stationary in the axial direction, with a hole tolerance through the pilot line. With a stroke adjustment of the main valve piston, the pilot line integrated therein is movable along the fixed cleaning wire element, as a result of which the impurities in the pilot line are removable.

In the above DE 36 42 669 A1, the cleaning wire element is guided substantially without contact through the pilot line. As a result, the lime deposits on the inner circumference of the pilot line and on the cleaning wire element can be removed only insufficiently.

SUMMARY OF THE INVENTION

It is therefore an object of the present invention to provide a process medium-controlled regulating valve, in which the operational reliability can be increased in a simple manner.

In an exemplary embodiment, the invention is based on the fact that in the prior art, a targeted scraping off of lime deposits located on the inner circumference of the pilot line is not possible. Against this background, the cleaning wire element has an actuating contour which, at least in the stroke adjustment, can be brought into sliding contact with a counter-contour formed on the main valve piston. The wire-side actuating contour and the piston-side counter-contour are geometrically designed so that they slide along one another during the build-up of a transverse force which acts on the wire element. Due to the transverse force application, the wire element can strike against the inner circumference of the pilot line, as a result of which possibly present lime deposits can be scraped off.

In a technical implementation, the cleaning wire element may have a diameter in the range of 0.3 to 0.5 mm, specifically at an inner diameter of the pilot line in the range of 0.7 to 0.9 mm.

In a simple technical embodiment, the cleaning wire element can have a wire body which is continuously straight in a wire longitudinal direction and from which the actuating contour projects in the transverse direction. With regard to a simple production, the actuating contour may be formed at a free end of the cleaning wire element. The free end of the wire element can project beyond a pilot line opening facing the inlet chamber. The free end of the wire can be freely movable, that is, be spaced apart by a clearance from the boundary walls of the inlet chamber. A particularly simple wire geometry results when the free end of the wire is continuously straight and is offset from the wire body by an oblique angle, which may be in a range of 0 to 45°, in particular 20°.

The cleaning wire element may have a round profile or a polygonal profile, preferably a square profile. Tests have shown that in the case of a square profile the edges can be designed with sufficiently sharp edges in order to produce a good scraping action. To increase the scraping properties, the cleaning element with a polygonal profile can be spirally twisted.

As an alternative to the above wire geometry, the cleaning wire element can be spirally wound, especially in the area of the wire body. The adjoining free wire end, however, as already mentioned above, can be formed straight with a continuously constant wire cross section. In an alternative wire geometry, the cleaning wire element, in particular its wire body, can have a wave profile. To increase the cleaning effect, it is preferred if the wave height of the wave profile increases in the direction of the pilot line opening facing the inlet chamber.

As mentioned above, it is preferred in terms of manufacturing technology to form the free wire end as straight with a continuously constant wire cross section. Instead, however, the free wire end may optionally also be formed as an angled loop.

To further increase the operational reliability, a helical compression spring, which can extend around the pilot valve piston, can be supported in the control chamber between the main valve piston and a valve housing wall facing away axially therefrom. By means of the helical compression spring, an additional spring force (i.e., a closing force) can be applied to the main valve piston, as a result of which even at a low water pressure on the inlet side the main valve piston can be reliably held in its closed position. The helical compression spring can be extended in a double function made of the same material and integrally with the cleaning wire element, which extends radially outside of the helical compression spring through the pilot line.

In one embodiment, the main valve seat can have a sealing surface, which faces the main valve piston and is designed to be completely planar. In this way, a particularly large-area sealing zone results with a relatively low surface pressure between the opposite sealing partners. Possibly existing surface irregularities or impurities in the sealing zone can therefore even lead to leaks.

Against this background, the sealing surface facing the main valve piston can preferably be divided into a planar base surface, transverse to the axial direction, and a sealing edge projecting therefrom in the direction of the main valve piston. The sealing edge may preferably be disposed radially on the inside and the annular base surface radially on the outside. It is ensured in this way that the sealing edge of the main valve seat even with line contact at low water pressures can be pressed into the opposite sealing partner, which is preferably made of an elastic material. The elastic material of the sealing partner interacting with the main valve seat may preferably have a Shore/IRHD hardness of 40° to 70°. Possible existing surface irregularities on the elastic counterpart can be sealed by the upstream sealing edge. By means of the base surface, recessed compared with the sealing surface, an overload of the elastic counterpart, which can occur preferably with more frequent and long utilization, can be prevented.

At higher water pressures on the inlet side, the flat base surface serves as an additional sealing surface, which also experiences a certain depth of penetration into the elastic counterpart on the main valve piston, but avoids a too high surface pressure/load of the elastic sealing surface.

Because high lime precipitation can occur on all parts, around which water flows, during continuous use in hard water areas, a highly polished sealing surface is advantageous, on the one hand (so that the low surface roughness counteracts lime adhesion); on the other hand, the sharp sealing edge acts as a lime breaker, which causes the deposits on the elastic counterpart of the main valve piston to flake off and thus ensures a permanent sealing function.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein:

FIG. 6 to 9 each show different geometric variants of the cleaning wire element.

DETAILED DESCRIPTION

Figure 2:
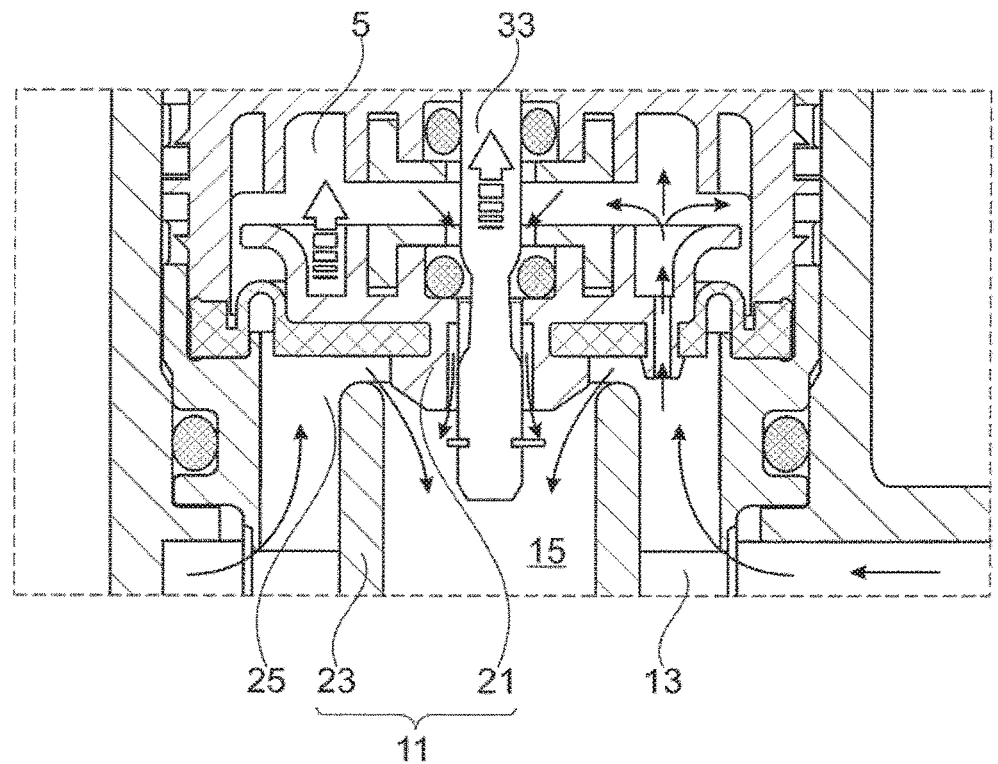
FIGS. 2 and 3 each are detail views from FIG. 1 in the opened state.
Figure 3:
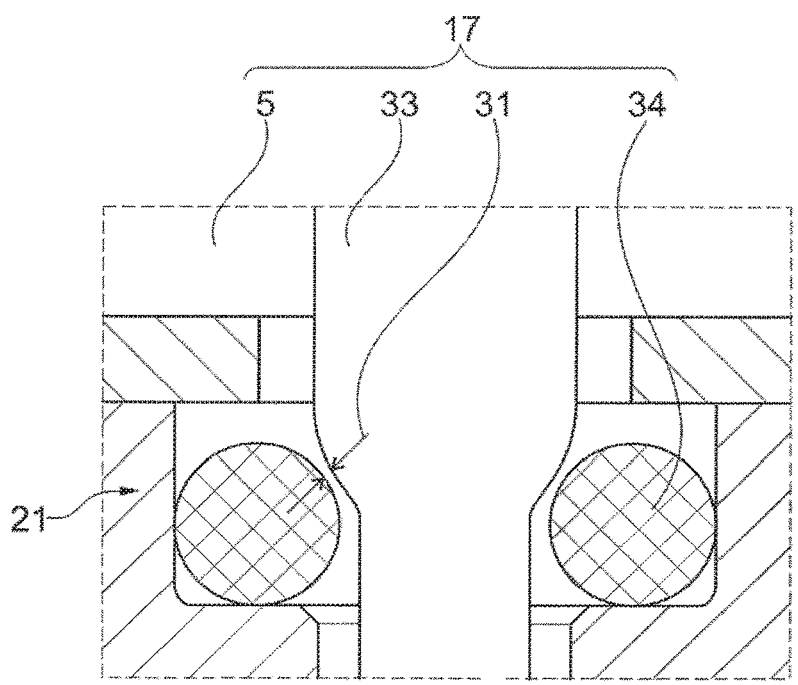

The structure and the basic operation of the process medium-controlled regulating valve will be described first for easier understanding of the invention with use of FIGS. 1 to 3. For reasons of clarity, a cleaning wire 3 guided through a pilot line 1 and a helical compression spring 41 disposed in a control chamber 5 are omitted in FIGS. 1 to 3 and shown only in FIGS. 4 and 5.

Figure 1:
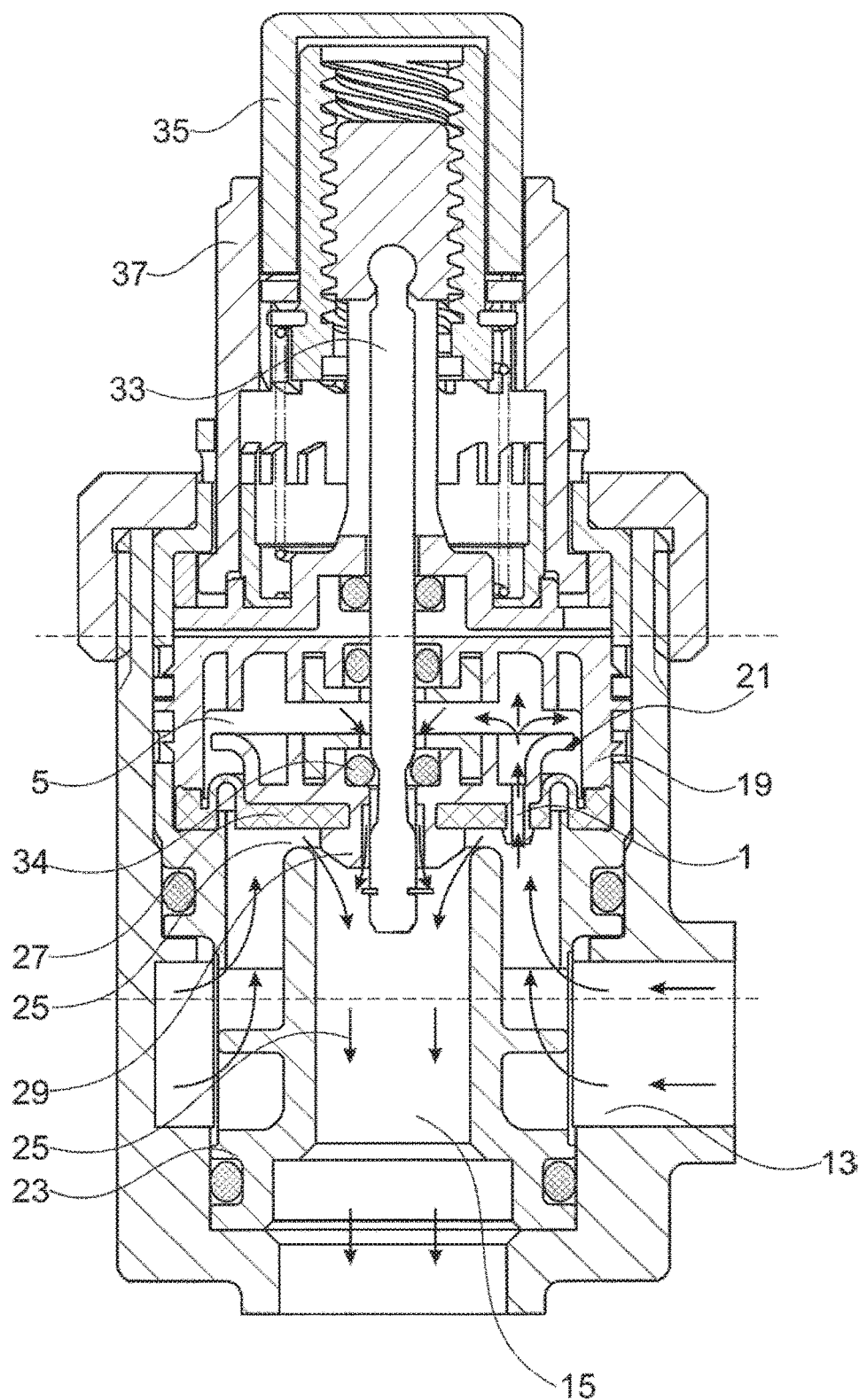
FIG. 1 shows a process medium-controlled regulating valve in a side view in a full section view.

The regulating valve shown in FIG. 1 comprises a main valve 11 (FIG. 2), with which a liquid throughflow between an inlet chamber 13 and an outlet chamber 15 can be regulated, and a pilot valve 17 controlling main valve 11 (FIG. 3), which can be used as a control component for main valve 11. Main valve 11 shown in FIG. 1 is made up of a main valve piston 21, with an adjustable stroke in the axial direction in a valve housing 19, and of a main valve seat 23 which interacts therewith. In FIG. 1, main valve piston 21 is shown in its open position, as a result of which a valve gap 25 is exposed for throughflow regulation. Inlet chamber 13 is disposed radially outside the hollow cylindrical main valve seat 23, whereas outlet chamber 15 is located radially inside main valve seat 23.

Main valve piston 21 is designed in two parts in FIG. 1, specifically, with a lower elastic membrane 27 to which a membrane plate 29, which is rigid in comparison thereto, is attached. Membrane 27 is fixed radially on the outside on valve housing 19. Control chamber 5 is located on the side of main valve piston 21, which side faces away from main valve seat 23 in the axial direction. This is fluidically connected via pilot line 1, integrated in main valve piston 21, to inlet chamber 13 and via a pressure relief line 31 to outlet chamber 15.

In addition, pilot valve 17 (FIG. 3) has a pilot valve piston 33, which is manually stroke-adjustable in the axial direction, specifically, in accordance with FIG. 1, either by means of a pushbutton 35 or alternatively with the aid of a rotary knob 37. In FIG. 1, pilot valve piston 33 is guided centrally through pressure relief line 31 in main valve piston 21. Depending on the manual actuation of the regulating valve, pilot valve piston 33 can be shifted between a closed position and an open position as well as into a regulating intermediate position. In FIG. 1, pilot valve piston 33 is shown in its open position, in which pressure relief line 31 is opened. A pressure equalization results in this way between control chamber 5 and outlet chamber 15. Accordingly, in FIG. 1 or 2, main valve piston 21, as shown, is moved upward in an opening direction due to the water pressure present in inlet chamber 13.

Figure 4:
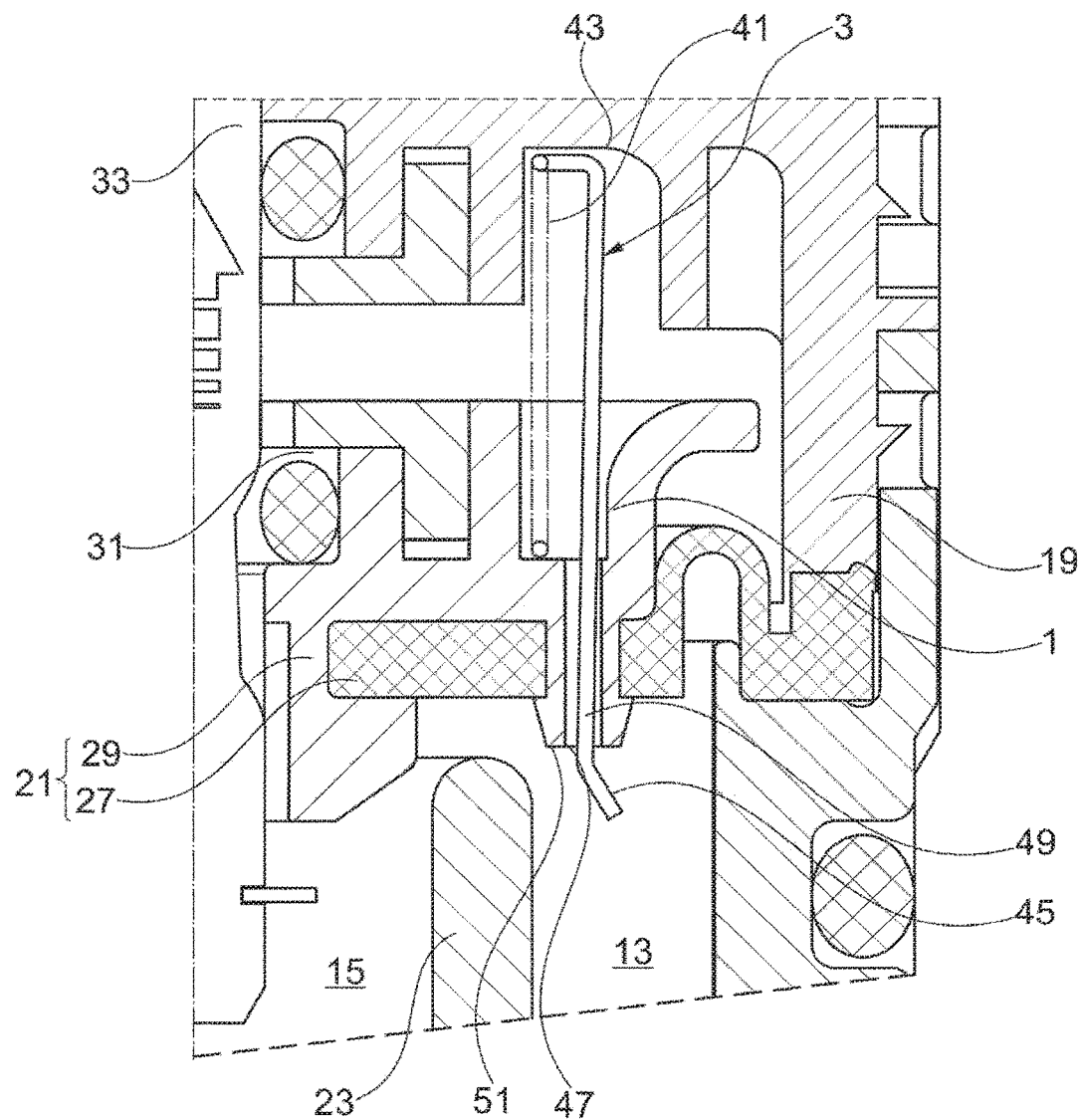
FIG. 4 is an enlarged partial half-section illustration that shows the regulating valve with the main valve open.
Figure 5:
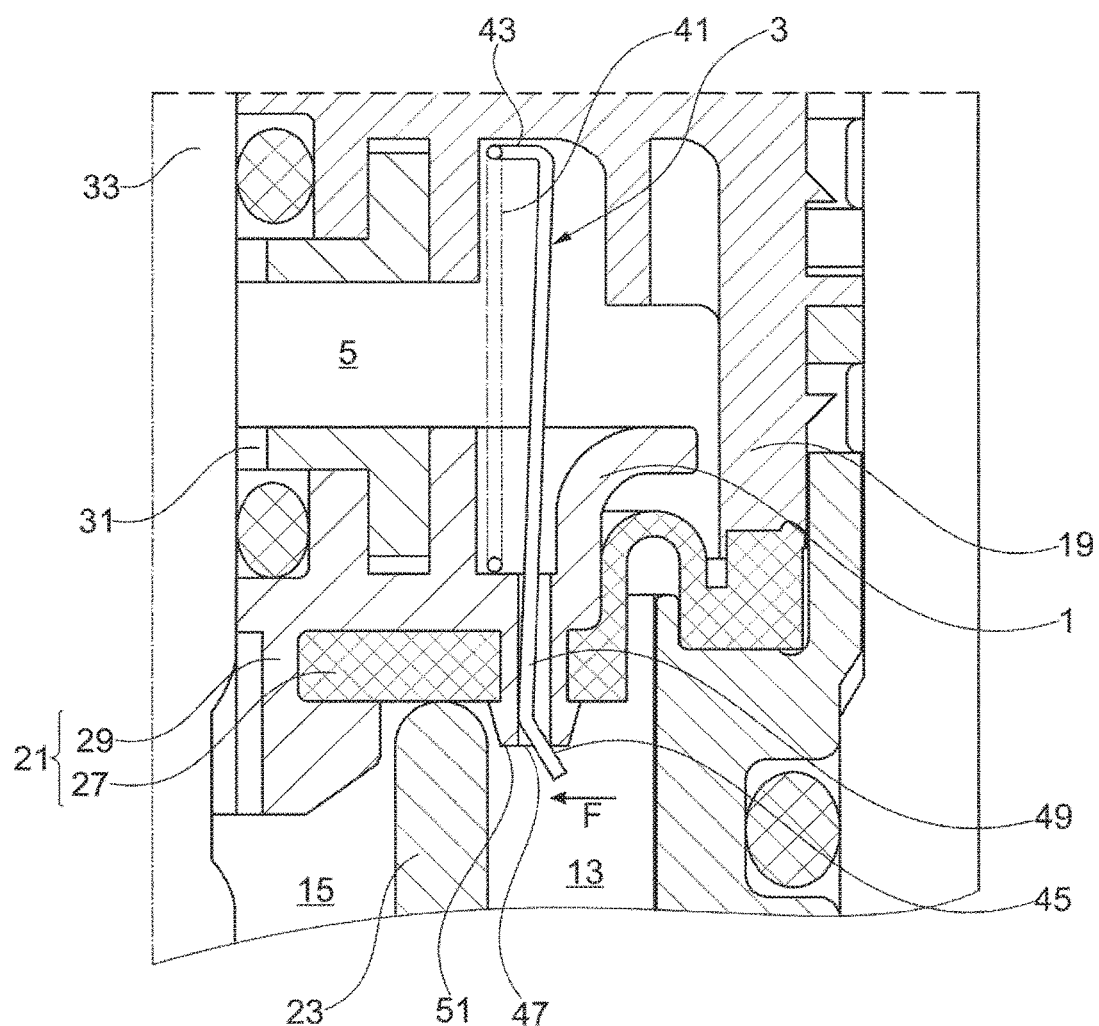
FIG. 5 is a view corresponding to FIG. 4 that shows the regulating valve with the main valve closed.

As is apparent from FIG. 4, in addition, a helical compression spring 41 is disposed in control chamber 5, which spring extends concentrically around pilot valve piston 33 and is supported between main valve piston 21 and an axially opposite valve housing wall 43.

Further variants of cleaning wire 3 are shown in FIGS. 6 to 9. Thus, in FIG. 6 cleaning wire 3 does not have a round profile but a square profile. To increase the scraping properties, the square profile is spirally twisted. In FIG. 7, cleaning wire 3 is spirally wound on its wire body 49. As in the previous embodiments, the adjoining free wire end 45 is formed straight with a continuously constant wire cross section. In FIG. 8, cleaning wire 3 has a wave profile 53 on its wire body 49. The wave height of wave profile 53 increases in the direction of pilot line opening 47 facing inlet chamber 13. In FIG. 9, the free wire end 45 is no longer straight but with an angled loop 55.

Figure 10:
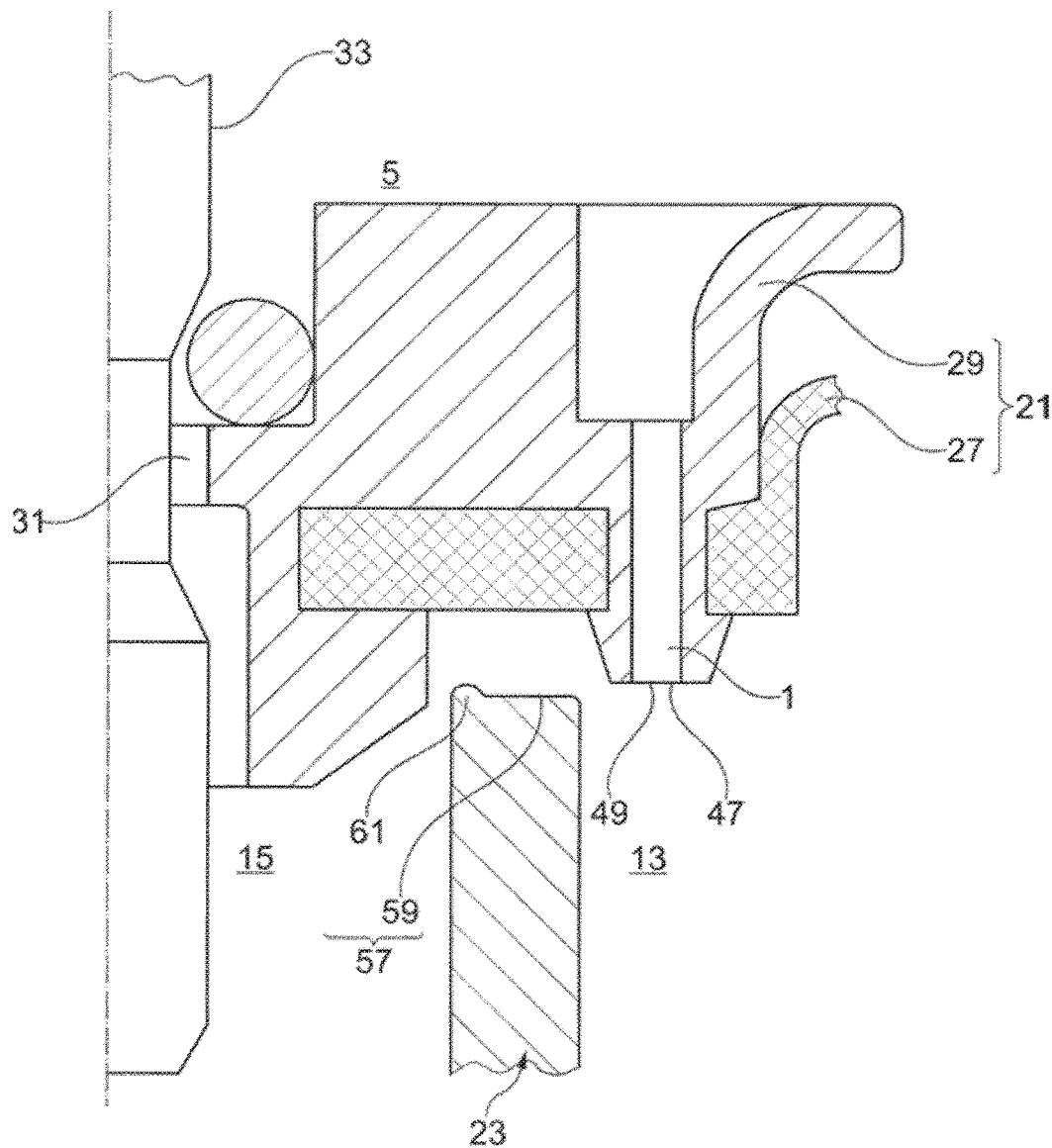
FIG. 10 is an enlarged half-sectional view that shows the main valve seat with an additional sealing edge.

A further exemplary embodiment is shown in FIG. 10 which is to be regarded as an alternative to the preceding exemplary embodiments or forms a refinement thereof. Thus, according to FIG. 10, main valve seat 23 has a sealing surface 57 facing main valve piston 21, which is divided in two, specifically, into a planar base surface 59, transverse to the axial direction, and a sealing edge 61 projecting in the direction of main valve piston 21. Sealing edge 61 is disposed radially on the inside and base surface 59 radially on the outside. Base surface 59 acts as a movement stop for limiting the stroke movement of main valve piston 21.

As an alternative to the variant shown in FIG. 10, sealing edge 61 can also be disposed radially on the outside and base surface 59 radially on the inside. Furthermore, when viewed in the radial direction, sealing edge 61 can also be disposed centrally, i.e., be bounded both radially on the outside and radially on the inside by planar base surface 59.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A process medium-controlled regulating valve for a liquid throughflow regulator, comprising:
   a main valve that has a main valve piston with an adjustable stroke in the axial direction;
   a main valve seat that interacts with the main valve and delimits an outlet chamber radially on an inside and an inlet chamber radially on an outside;
   a pilot valve for controlling the main valve piston, the pilot valve comprising on a side of the main valve piston which faces away from the main valve seat, a control chamber that is fluidically connected via a pilot line in the main valve piston to the inlet chamber and via a pressure relief line to the outlet chamber, and has a pilot valve piston which closes the pressure relief line in a closed position with a build-up of a closing pressure in the control chamber and with a stroke adjustment of the main valve piston in a closing direction, and which opens the pressure relief line in an open position with pressure equalization between the control chamber and the outlet chamber and with a stroke adjustment of the main valve piston in an opening direction;
   a cleaning wire element that is stationary in an axial direction is guided through the pilot line, the pilot line being adapted to be moved along the cleaning wire element, which is guided therein, during the stroke adjustment of the main valve piston in the closing direction and the opening direction, the cleaning wire element having an actuating contour which, at least during the stroke adjustment of the main valve piston in the closing direction and the opening direction, is adapted to be brought into sliding contact with a counter-contour formed on the main valve piston or with the build-up of a transverse force which acts on the cleaning wire element,
   wherein the cleaning wire element has a wire body portion provided inside of the pilot line and a free wire end that extends from a distal end of the wire body portion, an entirety of the free wire end being angled with respect to the wire body portion provided inside of the pilot line,
   wherein the counter-contour of the main valve piston is an opening edge of an opening of the pilot line and the actuating contour of the cleaning wire element is the free wire end, and
   wherein in the stroke adjustment of the main valve piston in the opening direction, the entirety of the free wire end is positioned outside of the pilot line and in the stroke adjustment of the main valve piston in the closing direction, a portion of the free wire end is guided through the opening of the pilot line, such that the portion of the free wire end is positioned inside of the pilot line.

2. The process medium-controlled regulating valve according to claim 1, wherein the wire body portion is continuously rectilinear in a wire longitudinal direction.

3. The process medium-controlled regulating valve according to claim 1, wherein the cleaning wire element has a round profile or a polygonal profile.

4. The process medium-controlled regulating valve according to claim 1, wherein the wire body portion of the cleaning wire element is spirally wound and wherein the free wire end is formed straight with a continuously constant wire cross section.

5. The process medium-controlled regulating valve according to claim 1, wherein the wire body portion of the cleaning wire element has a wave profile, and wherein a wave height of the wave profile increases in a direction of the opening of the pilot line facing the inlet chamber.

6. The process medium-controlled regulating valve according to claim 1, wherein the free wire end has an angled loop.

7. The process medium-controlled regulating valve according to claim 1, wherein a helical compression spring is supported in the control chamber between the main valve piston and a valve housing wall facing away axially therefrom, and the helical compression spring is extended with the cleaning wire element.

8. The process medium-controlled regulating valve according to claim 1, wherein the cleaning wire element has a square profile.

9. The process medium-controlled regulating valve according to claim 1, wherein the wire body portion of the cleaning wire element has a polygonal profile that is spirally twisted to increase scraping properties of the cleaning wire element.

10. The process medium-controlled regulating valve according to claim 1, wherein the free wire end of the cleaning wire element is spaced apart by a clearance from boundary walls of the inlet chamber.

11. The process medium-controlled regulating valve according to claim 10, wherein to form the actuating contour, the free wire end is angled from the wire body portion of the cleaning wire element by an oblique angle ($\alpha$) in a range of 0° to 45°.

12. The process medium-controlled regulating valve according to claim 1, wherein the main valve seat has a sealing surface, which faces the main valve piston, and the sealing surface is divided into a planar base surface, transverse to the axial direction and a sealing edge projecting therefrom in the direction of the main valve piston.

13. The process medium-controlled regulating valve according to claim 12, wherein the sealing edge is disposed radially on the inside of the main valve seat and the base surface is disposed radially on the outside of the main valve seat, and/or that the base surface acts as a movement stop for limiting the stroke movement of the main valve piston.

\* \* \* \* \*